US011583133B2

(12) United States Patent
Hugi

(10) Patent No.: US 11,583,133 B2
(45) Date of Patent: Feb. 21, 2023

(54) METHOD FOR PREPARING A BEVERAGE

(71) Applicant: Nestec S. A., Vevey (CH)

(72) Inventor: Niklaus Hugi, Bern (CH)

(73) Assignee: Societe des Produits Nestle S.A., Vevey (CH)

( * ) Notice: Subject to any disclaimer, the term of this patent is extended or adjusted under 35 U.S.C. 154(b) by 536 days.

(21) Appl. No.: 15/770,357

(22) PCT Filed: Oct. 21, 2016

(86) PCT No.: PCT/EP2016/075397
§ 371 (c)(1),
(2) Date: Apr. 23, 2018

(87) PCT Pub. No.: WO2017/068134
PCT Pub. Date: Apr. 27, 2017

(65) Prior Publication Data
US 2018/0310749 A1  Nov. 1, 2018

(30) Foreign Application Priority Data

Oct. 23, 2015 (EP) ..................................... 15191187

(51) Int. Cl.
*A47J 31/22* (2006.01)
*A47J 31/40* (2006.01)

(52) U.S. Cl.
CPC ............. *A47J 31/22* (2013.01); *A47J 31/407* (2013.01)

(58) Field of Classification Search
CPC ................................. A47J 31/22; A47J 31/407
See application file for complete search history.

(56) References Cited

U.S. PATENT DOCUMENTS 8,916,215 B2 * 12/2014 Yoakim .............. B65D 85/8043
426/77
2010/0178404 A1   7/2010 Yoakim et al.

FOREIGN PATENT DOCUMENTS

| CN | 101686771 A | 3/2010 |
| CN | 101959446 A | 1/2011 |
| CN | 102740745 A | 10/2012 |
| CN | 103108577 A | 5/2013 |
| WO | 2008148646 A1 | 12/2008 |

(Continued)

OTHER PUBLICATIONS

Chinese Office Action for Chinese Appl No. 201680061303.1 dated Nov. 29, 2019.

(Continued)

*Primary Examiner* — Rick K Chang
(74) *Attorney, Agent, or Firm* — K&L Gates LLP

(57) ABSTRACT

A method for preparing a beverage from a substance contained in a capsule is provided. The method includes rotationally driving the capsule at an adjustable rotational speed while feeding liquid into the capsule and draining the beverage produced in the capsule by a beverage draining means. Flow resistance of the beverage draining means is modified by at least one valve, and a state of the at least one valve is controlled by external valve operating means to modify the flow resistance of the beverage draining means while draining the beverage. The external valve operating means applies a force from outside the beverage draining means, and a magnitude of the force is not based on the beverage flowing inside the beverage draining means.

5 Claims, 13 Drawing Sheets

(56) References Cited

FOREIGN PATENT DOCUMENTS

WO  2009106598 A1  9/2009
WO  2012007293 A1  1/2012

OTHER PUBLICATIONS

English Translation of Chinese Office Action for Chinese Appl No. 201680061303.1 dated Nov. 29, 2019.
International Search Report, dated Jan. 5, 2017, in PCT/EP2016/075397, filed Oct. 21, 2016.
Written Opinion of the International Searching Authority, dated January 5, in PCT/EP2016/075397, filed Oct. 21, 2016.

* cited by examiner

METHOD FOR PREPARING A BEVERAGE

CROSS-REFERENCE TO RELATED APPLICATIONS/INCORPORATION BY REFERENCE STATEMENT

This application is a US national stage application filed under 35 USC § 371 of International Application No. PCT/EP2016/075397, filed Oct. 21, 2016; which claims priority to EP App No. 15191187.2, filed Oct. 23, 2015. The entire contents of the above-referenced patent applications are hereby expressly incorporated herein by reference.

TECHNICAL FIELD

The present disclosure relates to the field of the preparation of a beverage by centrifugation. In particular, it relates to a device for preparing a beverage such as coffee by using centrifugation to brew and extract the beverage from a receptacle.

BACKGROUND

The preparation of a beverage by using centrifugation is known. The principle mainly consists in providing a beverage ingredient in a receptacle, feeding liquid in the receptacle and rotating the receptacle at elevated speed to ensure interaction of the liquid with the ingredient while creating a gradient of pressure of liquid in the receptacle; such pressure increasing gradually from the centre towards the periphery of the receptacle. As liquid traverses the coffee bed, extraction of the coffee compounds takes place and a liquid extract is obtained that flows out at the periphery of the receptacle.

WO 2008/148601 describes a possible example of a device using such principle wherein the receptacle is a capsule containing beverage ingredients. Hot water is fed in the centre of the capsule via a water interfacing part comprising a water injector aligned in the rotation axis. The receptacle is held in a capsule holder which is rotated by means of a rotary motor. Both the liquid interfacing part and the capsule holding part are mounted along ball bearings. The beverage is extracted from the capsule by a plurality of peripheral needles that creates openings through a lid of the receptacle. As the capsule is centrifuged about its rotation axis, hot water passes through the beverage ingredient, interacts with it to produce a liquid extract and the resulting liquid extract traverses, under the effect of the centrifugal forces, the peripheral openings and is projected against an impact wall of the collector. The liquid extract, thus constituting the beverage, is then drained through a beverage duct of the device and collected into a recipient such as a cup.

WO 2008/148646 and WO 2008/148650 further describe a beverage preparation device wherein a flow restriction is created downstream of the receptacle, in particular a capsule, for example, by a valve system which opens or enlarges under the pressure created by the centrifuged liquid leaving the receptacle. The higher the rotational speed, the more the valve opens or enlarges. The valve system can be formed by a mobile restriction part of the device which is elastically urged against a rim portion of the capsule.

BRIEF DESCRIPTION OF THE DRAWINGS

Further features, aspects and advantages of the present disclosure shall now be described with reference to the figures of the enclosed drawings.

DETAILED DESCRIPTION

Figure 1:
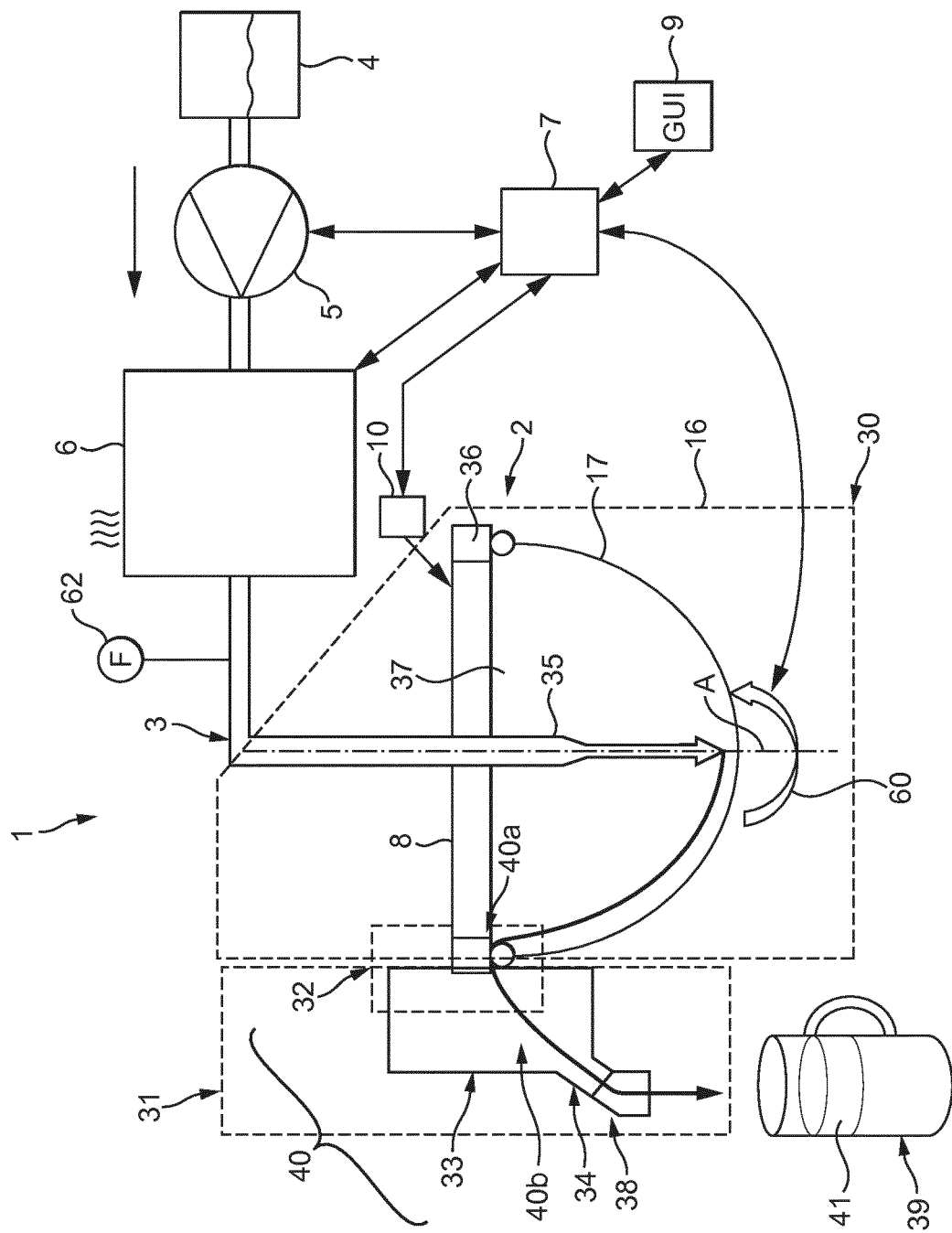
FIG. 1 shows the principles of a centrifugal beverage production device.

The present disclosure aims at providing such centrifugal beverage production device with means modifying the characteristics of a beverage produced.

In particular, when producing a coffee beverage, it can be desired that the produced coffee beverage, after being dispensed in a beverage receptacle, presents a so-called "crema" on its surface. However, it can also be desired that the coffee beverage is also produced with less or little 'crema' or even with substantially no 'crema' at all. Therefore, the flexibility to adjust the beverage characteristics, more particularly, the amount of 'crema' in the coffee beverage is desired.

This object is solved by means of the features of the independent claim. The dependent claims develop further the central idea of the present disclosure.

According to one aspect of the present disclosure, a device for preparing a beverage from a substance contained in a capsule, comprises:

a capsule holder arranged for holding such capsule, means for rotationally driving the capsule in an adjustable rotational speed, a liquid feeding unit for feeding liquid into the capsule, and beverage draining means for draining a beverage produced in the capsule.

The beverage draining means comprise at least one valve. Furthermore, at least one external valve operating means is arranged for controlling the state of the valve in order to modify the flow resistance of the beverage draining means. "External" is to be understood such that such valve operating means apply a force from outside the beverage draining means. This is in contrast to forces which the flowing beverage inside may produce against the inner wall or other elements inside the beverage draining means.

The external valve operating means may be arranged to control the state of the valve such that the higher the rotational speed, the higher the closing force of the valve. The closing force will typically act against the forces generated by the centrifuged beverage against the valve member, such that the valve state will finally be in an equilibrium state.

The flow rate of the beverage is a function of the rotational speed. Thus, a flow rate control may be implemented which controls the rotational speed such that a desired flow rate is achieved. The flow rate control may comprise a flow rate sensor feeding back the actual flow rate. As according to one aspect of the present disclosure, the flow resistance of the beverage draining means is a function of the rotational speed, thus also the flow resistance of the beverage draining means is a function of the flow rate control. The higher the flow rate, the higher the rotational speed and thus the higher the flow resistance of the beverage draining means.

According to an aspect the external valve operating means control the closing force, but not the absolute state of the valve (which is the result of an equilibrium of forces as discussed above).

In other embodiments, the external valve operating means may control the absolute state of the valve ("position control", e.g. by increasing the closure force until the absolute state is reached).

The valve may be controlled such that the flow resistance is higher at a first rotational speed than at a second rotational speed, wherein the second rotational drive speed is lower than the first rotational speed.

The first and second rotational speeds are not related to a particular sequence of rotational speeds and may be applied selectively for preparing a beverage depending on the characteristics of extraction desired.

The valve operating means may control the state of the valve such that the flow resistance of the beverage draining means increases in at least one subrange or the total of the range of the adjustable rotational speed.

The valve operating means may control the state of the valve such that
the valve is in a state of lower flow resistance when the rotational speed is between 0 rpm and a threshold rotational speed, and the valve is in a state of higher flow resistance when the rotational speed is higher than the threshold rotational speed.

When the rotational speed is higher than the threshold rotational speed, the valve operating means may control the state of the valve such that the valve increases the flow resistance with increasing rotational speed, or keeps constant the flow resistance with increasing rotational speed.

The beverage draining means may comprise a section which is arranged to be rotatable together with the capsule holder, and wherein the at least one valve is arranged in the rotatable section of the beverage draining means. In particular, the rotatable section may be a liquid interfacing part of the device arranged for supporting the valve.

The external valve operating means may comprise a valve member, e.g., a valve compressing member, which is arranged to be displaced in a flow resistance increasing direction by centrifugal forces when the rotatable section of the beverage draining means and thus the mass of the valve member (or another mass connected to the valve member) is rotated.

The valve member, e.g., valve compressing member, may be arranged to be displaceable in rotation and/or translation.

The displacement of the valve member is effective between a state of low (or substantially no) flow resistance to a state of higher flow resistance of the valve.

The valve may comprise restoring force means biasing the valve towards the state of lower flow resistance. In certain non-limiting embodiments, the restoring force means is arranged to act against the valve member.

The restoring force means may be for example a spring element arranged to bias the valve towards the state of lower flow resistance. The spring element can be external to the walls of the beverage draining means. Alternatively, the restoring force means may be an integral resilient wall part of the beverage draining means arranged to engage the valve towards the state of lower flow resistance.

In certain non-limiting embodiments, the restoring force means (e.g. spring element) forces the valve to return to a state of lower flow resistance when the rotational speed is lower or equal than a threshold rotational speed. On the contrary, when the rotational speed is above the threshold, the restoring force means does not provide a sufficient effort on the valve to return it to the state of lower flow resistance.

In certain non-limiting embodiments, the restoring force means (e.g. spring element) is arranged to oppose the displacement of the valve member toward the state of higher flow resistance. Therefore, in absence of rotation or at a lower rotational speed, the restoring force means maintains the valve member in a position in which the valve is maintained open.

The valve may comprise a flexible membrane arranged to vary the free cross-section of the beverage draining means when displaced. This action of the flexible membrane thereby determines the flow resistance of the beverage draining means.

The device may comprise capsule identification means and/or user interface means. The means for operating the state of the valve may be designed to control the state of the valve based on information provided by the capsule identification means and/or user interface means.

A further aspect of the present disclosure relates to a method for preparing a beverage from a substance contained in a capsule, the capsule being placed in a beverage production device, the method comprising:
  rotationally driving the capsule in a range of rotational speeds while feeding liquid into the capsule, and
  draining a beverage produced in the capsule by beverage draining means,
  wherein the flow resistance of the beverage draining means is modified by at least one valve,
  wherein the state of the valve is controlled by external valve operating means.

The present disclosure also provides a beverage device for preparing a beverage by centrifugation, from a capsule rotated in the device, comprising:
  a capsule holder arranged for holding a capsule,
  means for injecting liquid in the capsule,
  means for rotationally driving the capsule holder at an adjustable rotational speed for providing centrifugal forces in the capsule,
  at least one valve arranged to form a variable opening cross-section for the flow of beverage,
  external valve operating means adapted to impart no or a lower closing force to the valve resulting in a first state of the valve in which the beverage flow opening cross-section of the valve is enlarged or not restricted and, to impart a higher closing force to the valve resulting in a second state of the valve in which the beverage flow opening cross-section of the valve is reduced or restricted compared to the first state.

In certain non-limiting embodiments, the external valve operating means are arranged or controllable according to these two different states of the valve in a manner that in the second state of the valve, the rotational speed/speeds is/are set at higher value/values than in the first state of the valve.

In a mode, the valve comprises at least one valve member, e.g., a valve compressing or closing member, arranged to be movable from the first state towards the second state of the valve by the action of the centrifugal force which exerts on the valve member. For example, the valve member can be a pivot member, pivotable by the action of the centrifugal forces for pressing on at least one soft, elastic membrane which is arranged for restricting the flow opening cross-section of the valve when such pressing action is engaged. In certain non-limiting embodiments, the pivot member comprises at least one mass of inertia, e.g., a metal piece having a density higher than 7, such as (but not limited to) higher than 8.

According to an aspect, the present disclosure relates to a beverage device for preparing a beverage by centrifugation, from a capsule rotated in rotating parts of the device and containing ingredients comprising:
- a capsule holder for holding a capsule,
- a liquid interfacing part comprising a liquid injector for injecting liquid in the capsule to mix with the ingredients and beverage extraction means for assisting in extracting the beverage from the capsule,
- means for driving in rotation rotating parts including the capsule holder and at least a section of the liquid interfacing part, thereby creating centrifugal forces inside the capsule,
- beverage draining means comprising:
  a) at least one valve with at least one deforming or moving part capable of reducing the beverage flow cross-section of the valve and,
  b) external operating means arranged to control the flow cross-section of the valve by actuation on the deforming or moving part;
- wherein the external operating means comprises at least one valve actuation member operatively arranged to be movable under the effect of the centrifugal forces in a manner to deform or move the deforming or moving part of the valve in the direction of a reduction of the beverage flow cross-section of the valve when the rotational speed of the rotating parts increases.

In particular, the valve actuation member can be arranged on one of the rotating part, such as (but not limited to) on the liquid interfacing part, so as to pivot or translate as a result of or under the action the centrifugal forces applied thereon.

The device can comprise a biasing means, such as a spring element, arranged with the valve actuation member to apply a biasing force on the valve actuation member which is opposed to the direction corresponding to a reduction of the beverage flow cross-section of the valve.

In certain non-limiting embodiments, the biasing means is configured such that when the rotational speed of the rotating parts is below or at a threshold value, the valve actuation member takes a first state in which the beverage flow cross-section of the valve is enlarged or open and, when the rotational speed of the rotating parts is above the threshold value, the valve actuation member takes a second state forcing a reduction of the beverage flow cross-section of the valve compared to the enlarged or open position.

It should be noted that in the second state, the valve may take different relative positions as to the reduction of the flow cross section that essentially depends on the rotational speed and the pressure of beverage acting on the valve.

The moving or deforming part of the valve can be an elastic membrane. The elastic membrane can be moved and/or deformed as a response to the movement of the valve actuation member combined to the pressure of the beverage flow through the valve and contacting the membrane. In alternatives, the moving or deforming part of the valve can be a portion of elastically deformable conduit guiding the flow of beverage. The elastically deformable conduit can be deformed, in particular by its cross section narrowing, as a response to the movement of the valve actuation member combined to the pressure of the beverage flow through the conduit.

The present disclosure also relates to a system comprising a beverage preparation device as aforementioned and a capsule containing beverage ingredients.

The principles of a centrifugal beverage device shall now be described with reference to FIG. 1. The device 1 of the present disclosure generally comprises as known 'per se' a centrifugal brewing unit 2 for receiving and centrifuging a receptacle such as a removable capsule 17. The centrifugal brewing unit 2 is designed for preparing a beverage such as coffee, from both a beverage ingredient contained in the capsule 17 and water injected in the capsule 17. The injected water interacts (such as by brewing or mixing) with the beverage ingredient and, by virtue of the centrifugal forces, a beverage extract is obtained which is forced to leave the capsule 17 at its periphery. The unit 2 is placed in liquid communication with a liquid supply line 3 intended for supplying a heated liquid, such as (but not limited to) water, from a reservoir 4 to the unit 2. The liquid is circulated through the line 3 by a pump 5. The pump 5 can be of any suitable type such as a piston pump, a diaphragm pump, a gear pump or a peristaltic pump, for example. A heater 6 is provided along the liquid supply line to heat the liquid at a temperature above ambient temperature. The temperature may vary depending on the beverage to be extracted. For instance, for coffee, water can be heated between about 70 and 100 degrees Celsius.

The brewing unit 2 comprises two rotating parts 30 connected together, in particular, a liquid interfacing part 8 and a holding part or capsule holder 16. The two parts 8, 16 are designed for holding the capsule 17 containing a beverage ingredient. The device 1 further comprises a rotational driving means 60 such as a rotary electric motor which is coupled to one of the rotating parts of the brewing module such as the holding part 16 via a coupling means. The rotating parts are arranged in closure, i.e. are connected together by connections at least during rotation in such a manner that these parts 8, 16 rotate together about an axis A with the capsule 17 during centrifugation. It should be noted that the capsule holder 16 may take various configurations and may not necessary be completely separable from the first rotating part.

A control unit 7 is also provided to control the brewing operation, in particular, the rotational speed of the rotating parts 30 via the motor, the temperature of the liquid provided by the heater 6 and other operations such as the flow rate and amount of liquid supplied by the pump 5. A flow meter 62 can be positioned in the flow liquid supply line to measure the liquid flow and provide input to the control unit 7. As will be explained later, the control unit 7 may also receive information from a user interface 9 and/or a capsule identification system 10. An example for such capsule identification system is a bar code reader 10 underneath the rim of the capsule 17.

The liquid interfacing part 8 can comprise an injector 35 designed for supplying (e.g. injecting) a liquid like water in the (e.g. along the rotational center axis of the) capsule 17. On its upper end, the injector 35 is in liquid communication with the liquid supply line 3. Additional liquid control means such as a check valve may be provided upstream the injector 35. At the periphery of the lower surface of the liquid interfacing part 8 is located a series of beverage extracting means 36 designed to perforate the inlet wall 37 of the capsule 17 in multiple zones to provide multiple beverage outlets for finally extracting the beverage from the capsule 17. The peripheral outlets are thus created in the inlet wall 37 close to the rim of the capsule 17 where the centrifugal forces are the highest. Alternatively, it could be envisaged to provide outlets on the side wall of the capsule 17 or both on the inlet wall 37 and side wall of the capsule 17. The beverage outlets could also be pre-made in the capsule 17 before insertion of the capsule 17 in the device 1. It could also be that the rim of the capsule is formed as a plurality of outlets for the centrifuged liquid.

As can be seen in FIG. 1, the means 40 for draining the beverage from the capsule comprise a first section 40a (when seen in the flow direction of the produced beverage) which is part of the rotating parts 30 of the beverage production device 1. An interface 32 is provided at which the beverage is guided ("handed over") from the first rotating section 40a to a second section 40b of the beverage draining means 40, which second section 40b is part of the static parts 31 of the beverage production device. The second (static) section 40b comprises a collector 33, a collector exit 34 leading to a beverage production device outlet 38 arranged to guide the beverage into a beverage receptacle 39. A rotational seal is provided between the rotating parts 30 and the static (stationary) parts 31 of the beverage production device.

According to the present disclosure, means are provided for altering beverage characteristics by controlling the flow characteristics, such as the flow resistance of the beverage draining means 40. Such means for changing the flow characteristics can be provided in the first (rotatable) part 40a and/or the second (static) part 40b of the beverage draining means. In the embodiments explained in the following these means for modifying the flow characteristics of the beverage draining means comprise a valve 50 in the particular mode of FIGS. 2a, 2b.

The inventors have found out that modifying the flow characteristics, especially the flow resistance of the beverage draining means 40 has an impact on the characteristics of the produced beverage. E.g. when a coffee beverage is produced, increasing the flow resistance of the beverage draining means 40 causes a pressure drop which in turn promotes the production of the so-called "crema". The "crema" 41 will actually occur when the beverage is dispensed in the beverage receptacle 39 ("in-cup crema").

Figure 2A:
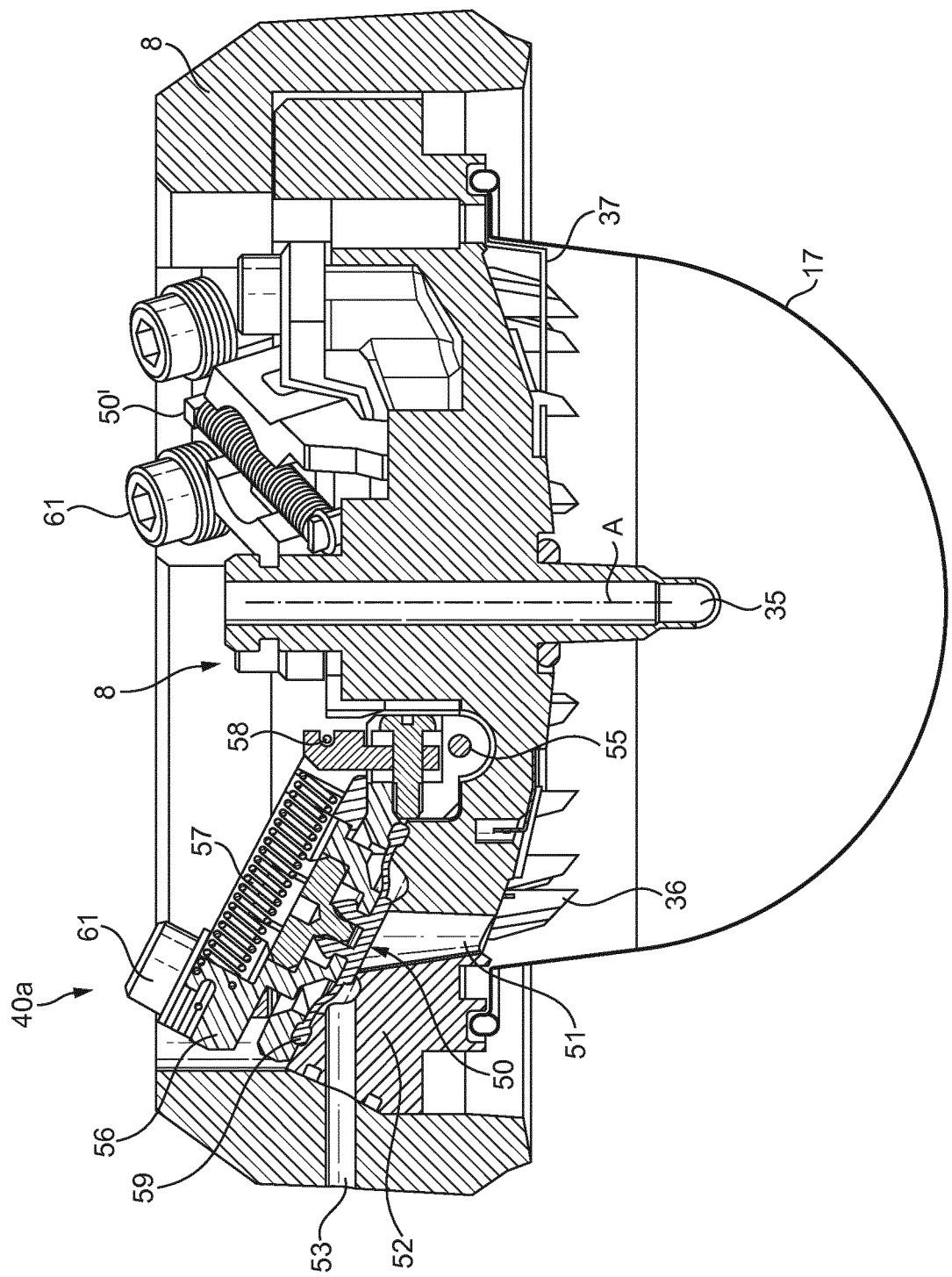
FIG. 2a shows a cross-sectional view of a first embodiment of a valve in the beverage draining means of the device of FIG. 1 (with the capsule holder being omitted), wherein the valve is in a closed state (i.e., reduction of its flow cross-section).
Figure 2B:
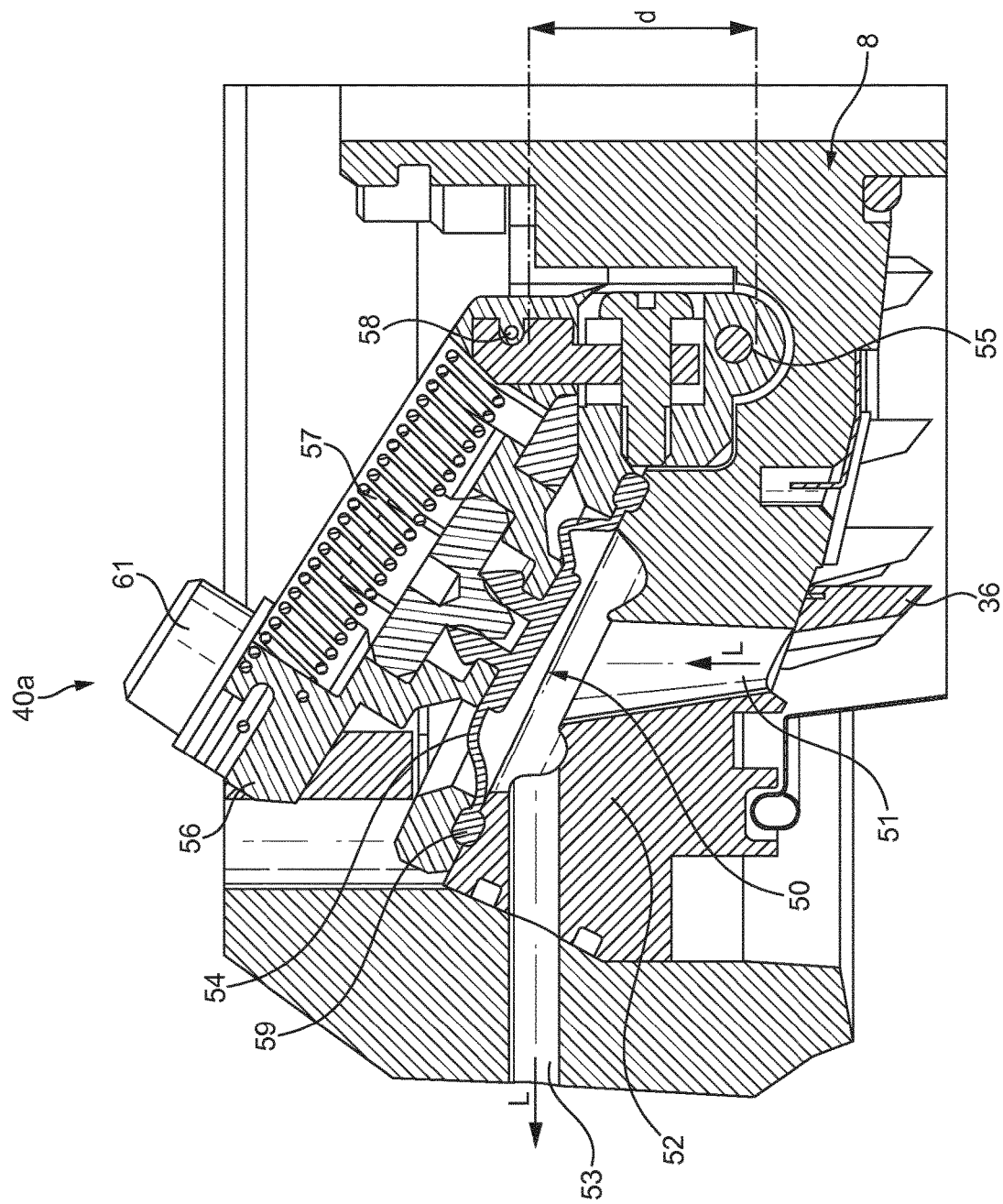
FIG. 2b shows a cross-sectional view of the valve of FIG. 2a while being in the open state.

FIGS. 2a, 2b show an embodiment in which such flow characteristic modifying means comprise a valve 50 arranged in the rotatable first section 40a of the beverage draining means 40. In the example such rotatable first section 40a and thus the valve 50 are arranged within the liquid interfacing part 8 in which also the injector 35 is arranged.

The centrifuged beverage drained from the rotating capsule 17 is guided upwards (i.e. in a direction substantially perpendicular or inclined radially outwards when seen in the beverage flow direction) to the inlet wall of the capsule 17 through a first (e.g. essential axial or vertical) channel 51 of rotatable first section leading to the valve 50. The axial or vertical channel 51 leads to a bend section 52 of the beverage draining means 40. In the embodiment this bend section 52 forms an angle in the order of 60 degrees to 120 degrees, such as (but not limited to) 80 degrees to 100 degrees in the shown example.

The valve 50 according to this example is arranged in the bend section 52 of the first (rotatable) section 40a of the beverage draining means 40. Downstream of the valve 50 (when seen in the beverage flow direction) a (e.g. essentially radial or horizontal) draining channel 53 is provided, which leads for example to the interface 32 shown in FIG. 1 and, thus, towards the second (static) section 40b of the beverage draining means 40. The second static section 40b collects the beverage from the rotating parts and guide it to the receptacle 39.

In the example shown in FIGS. 2a, 2b the valve 50 comprises a membrane 54 which is mounted in a rotatable manner around a rotation axis 55. It is to be understood that other valve designs are possible in which such membrane 54 or other valve element are arranged in a manner such that they are movable in translation (i.e. essentially linearly) and/or in combined rotation and translation.

The membrane may be made from silicone or any other food grade elastic material.

In the shown example the membrane 54 is mounted on a pivot means 56, which pivot means 56 is mounted in a rotatable manner in the rotating part or liquid interfacing part 8 of the beverage production device 1 by means of the rotation axis 55.

The pivot means 56 is one example for external valve state operating means. When rotated, the mass of the pivot means 56 (and any mass fixedly connected thereto) generates a centrifugal force, which one example of a force generated "externally", i.e. not internally (inside the beverage draining means) by flowing beverage. This external force is then used to control the change of the state of the valve 50.

In FIGS. 2a, 2b a least one additional mass 61 is shown which is attached (e.g., screwed) to the pivot means 56 to adjust and increase the centrifugal forces upon rotation.

The forces for closing the valve 50 (or reducing its flow cross-section) in the shown example are generated by centrifugal forces caused by the rotation of a mass of inertia including the pivot means 56. When the capsule 17 and the rotating parts of the beverage production device are rotated, the centrifugal forces will cause a rotation or pivoting of the membrane 54 (against the clock in the shown example) around the axis 55 (which is an axis perpendicular to the rotation axis of the capsule and, in certain non-limiting embodiments, perpendicular to a radial direction of the capsule in the transversal section of FIG. 2a), which rotation will cause an increase of the flow resistance of the beverage draining means. Again, the rotation of the membrane is just an example for a control of the valve state towards a state in which the valve increases the flow resistance of the beverage draining means 40.

It is easily understood that the higher the rotational speed, the higher the centrifugal forces (essentially the centrifugal forces increase with the square of the rotational speed). Thus, the higher the rotational speed, the higher the closing force.

In order to make the valve 50 assume its state with lower flow resistance of the beverage draining means 40 (FIG. 2b), biasing means or restoring force means such as a helicoidal spring 57 are provided which bias the valve 50 towards the open state.

In the shown example, the radially inner end 58 of the helicoidal 57 spring is mounted offset to the rotation axis 55 by a distance d, such that the helicoidal spring 57 produces a torque in the clockwise direction in example of FIG. 2a, 2b.

In a particular (but non-limiting) example, the helicoidal spring 57 or other biasing means are pre-stressed, such that in a first rotational speed range no state change of the valve 50 occurs until the centrifugal forces overcome the pre-stressing force of the helicoidal spring 57. This will be further explained with reference to FIG. 3.

It is important to note that according to the present disclosure, one or more valves 50, 50' with associated channels 51, 53 of the beverage draining means may be arranged in the rotational part 30 of the beverage production device 1. In one example three valves 50, 50' are arranged regularly spaced at an angular distance of 120°. Of course the number of valves is not limited to three and can be 4, 5 or 6.

While FIG. 2b shows the state in which the valve 50 is in a state in which the flow resistance of the beverage draining means 40 is lower ("open state"), FIG. 2a shows the state in which the valve 50 is in the "closed" state. It is to be understood that "closed" does simply mean a state in which the valve 50 is in a state such that the flow resistance of the beverage draining means 40 is higher compared to the open state of FIG. 2b. However, even in the closed state the valve 50 is not completely shutting off the beverage draining means 40 or channel 51. Rather, the valve will be in a state with higher flow resistance in which there is an equilibrium between the valve closing force (essentially the difference between the centrifugal force and the biasing force of the helicoidal spring 57) and the force produced by the beverage coming from the channel 51 and acting on the valve.

In such closed state there will be a restricted cross section of the beverage flow in the area of the valve 40. This beverage is typically pressurized also by means of the centrifugal forces. Thus, as shown in FIG. 2a, beverage may also flow in the closed state of the valve 50. However, the pressure drop and the pressure upstream of the valve 50 are increased in the closed state of the valve 50 when compared to the open state of the valve 50. It is thought that this increased pressure drop promotes the production of the crema in the finished beverage product.

As can be seen from FIGS. 2a and 2b, the rim 59 of the membrane 54 is sealed to the parts, e.g. the bend section 52 and pivot means 56, in which the channels 51 and 53 are formed. Thus, even in the open state of FIG. 2b of the valve 50, beverage coming from the channel 51 cannot leak in the area of the valve 50, but rather will still have to exit through the radial or horizontal channel 53 (the path of liquid is illustrated by arrows "L"). Due to this sealing of the rim 59 of the membrane 54, the inner part of the membrane will be pushed by the pivot means 56 towards a closed state of the valve at high rotational speeds.

In the embodiment of FIGS. 2a, 2b the membrane is moved by the hinged pivot means 56. The hinged pivot means 56 is an example of external valve controlling means. "External" is to be understood such that such valve operating means apply a force from outside (relative to the beverage draining means). This is in contrast to internal forces acting on the beverage draining means and generated e.g. by the centrifuged beverage when acting against the inner walls or other elements inside the beverage draining means. The valve state according to the present disclosure thus is a function of such control forces produced by the external valve control means.

In the embodiment of FIGS. 2a, 2b the membrane is an example of a valve member which is part of the wall of the beverage draining means. The valve member can additionally or alternatively also be located within the beverage draining means.

In the shown example the membrane is an example of a flexible wall of the beverage draining means being part of the valve. However, the beverage draining means may present rigid walls, not deformed when changing the state of the valve. In such cases typically a movable valve member is provided within the walls of the beverage draining means.

In the embodiment of FIGS. 2a, 2b the membrane is a movable part of the beverage draining means, acting against static parts of the beverage draining means. However, the valve may comprise more than one movable part.

In the embodiment of FIGS. 2a, 2b the state of the valve is modified by changing the rotational speed of the capsule and the rotating parts of the beverage production device. In an example, thus the production of "crema" on top of a coffee beverage can be controlled by adapting the rotational speed during the beverage production process. The valve state can also be changed within the beverage production process such that e.g. the valve is only closed during a time period smaller than the entire beverage production process. E.g. the crema production can be "promoted at the end of the beverage production process. Thus, the duty cycle during which the valve is closed is at least one parameter of the beverage production process determining the amount and/or the quality of the crema.

Other embodiments are possible where the valve state is not modified by the rotational speed but, for example, by enabling/blocking means, which may selectively block the change of the valve state such that the valve state will remain in its current state even when the rotational speed is changed. The production of crema can be disabled or blocked independently of the rotational speed.

In the embodiment of FIGS. 2a, 2b the valve state control means are purely mechanical. The valve control means in this embodiment can be viewed as "passive" elements as the driving force for the valve state change, i.e. the centrifugal force, "passively" is generated by the rotation. However, in other embodiments the valve control means may comprise an active actuator driving the modification of the valve state independently of the rotation.

For instance, the valve state control means may be at least one electrically-driven actuator such electro-mechanical, electrical, electromagnetic or induction actuator, such as a solenoid, electromagnet(s), electrical motor(s), and the like. In such case, the valve state may be controlled completely independently from the rotational speed. Rather, the valve state may be controlled at any suitable rotational speed. The switching of the valve state thus may involve electric signals send to the one or more electrically driven actuators.

Generally, the modification of the valve towards the flow resistance increasing state may be performed each time a beverage production process is run. Alternatively it may be performed selectively, i.e. dependent on a signal from a capsule identification device 10 of the beverage production device (involving the detection of an identification feature of the capsule) and/or a signal from a user interface 9 (touch screen, remote control, switches and the like) respectively communicating with the control unit 7. Thus the valve state may be controlled depending on the type of capsule and/or the user's input.

Furthermore, in the embodiment of FIGS. 2a, 2b the valve operating means do not involve a feedback mechanism in order to implement a feedback control. Especially when having an electric control, sensing means can be arranged on or within the beverage draining means sensing e.g. the pressure or the pressure drop of the beverage at the valve or alternatively the flow rate of the beverage.

The pressure or flow rate sensing means may also be arranged in the inlet tube 3 for the liquid supplied to the capsule 17.

The control unit 7 may communicate with the valve state control means and can implement a feedback control of the state of the valve such that the sensed parameter (pressure, speed, of the beverage, etc.) can be controlled to a given nominal value. The nominal value can be dependent on the rotational speed, by providing a nominal value/rotational speed table, curve or function. The nominal value may develop (vary) along with an ongoing beverage production process.

Figure 3:
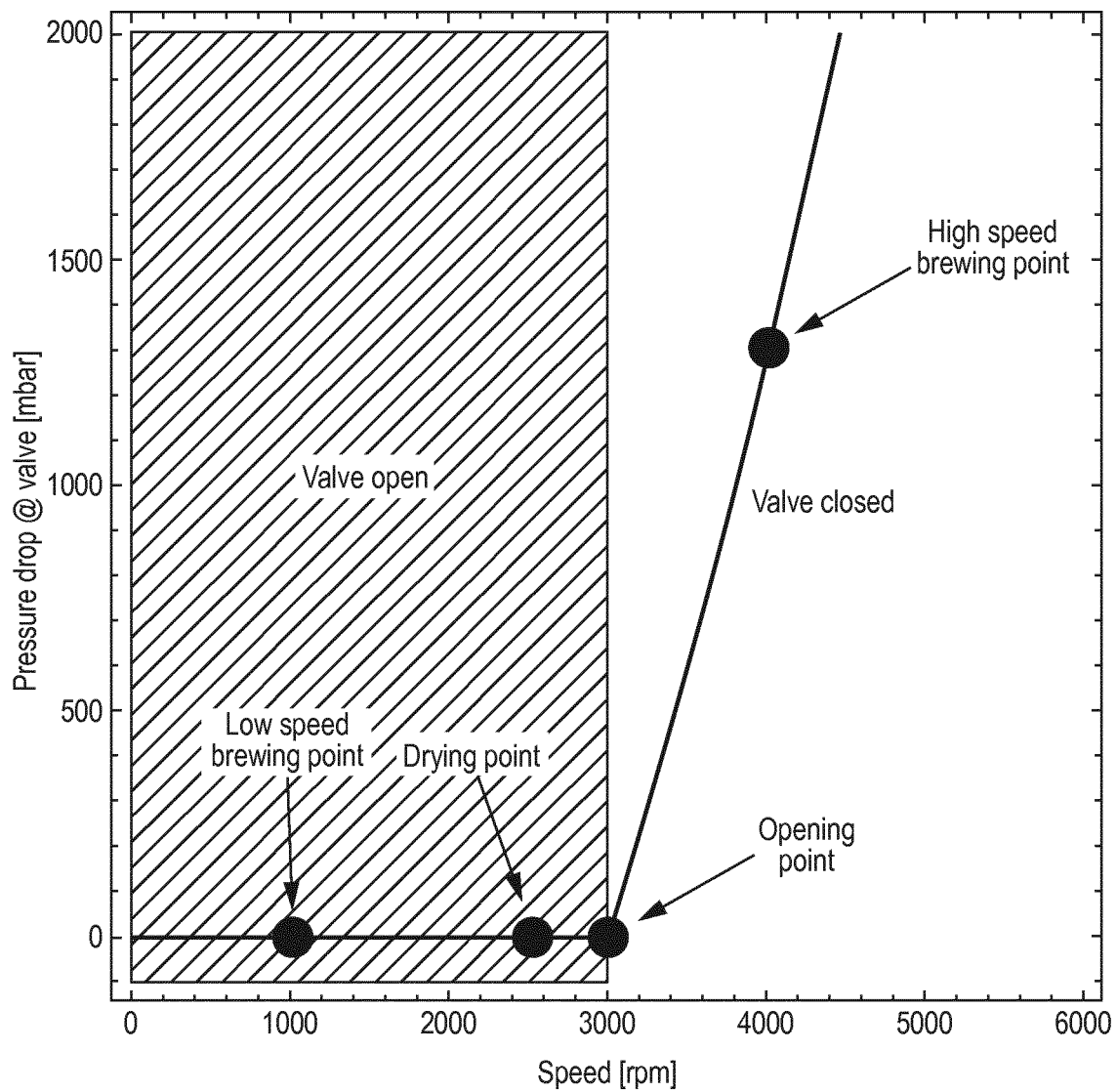
FIG. 3 shows a backpressure/rotation speed curve of a valve according to the present disclosure.
Figure 4:
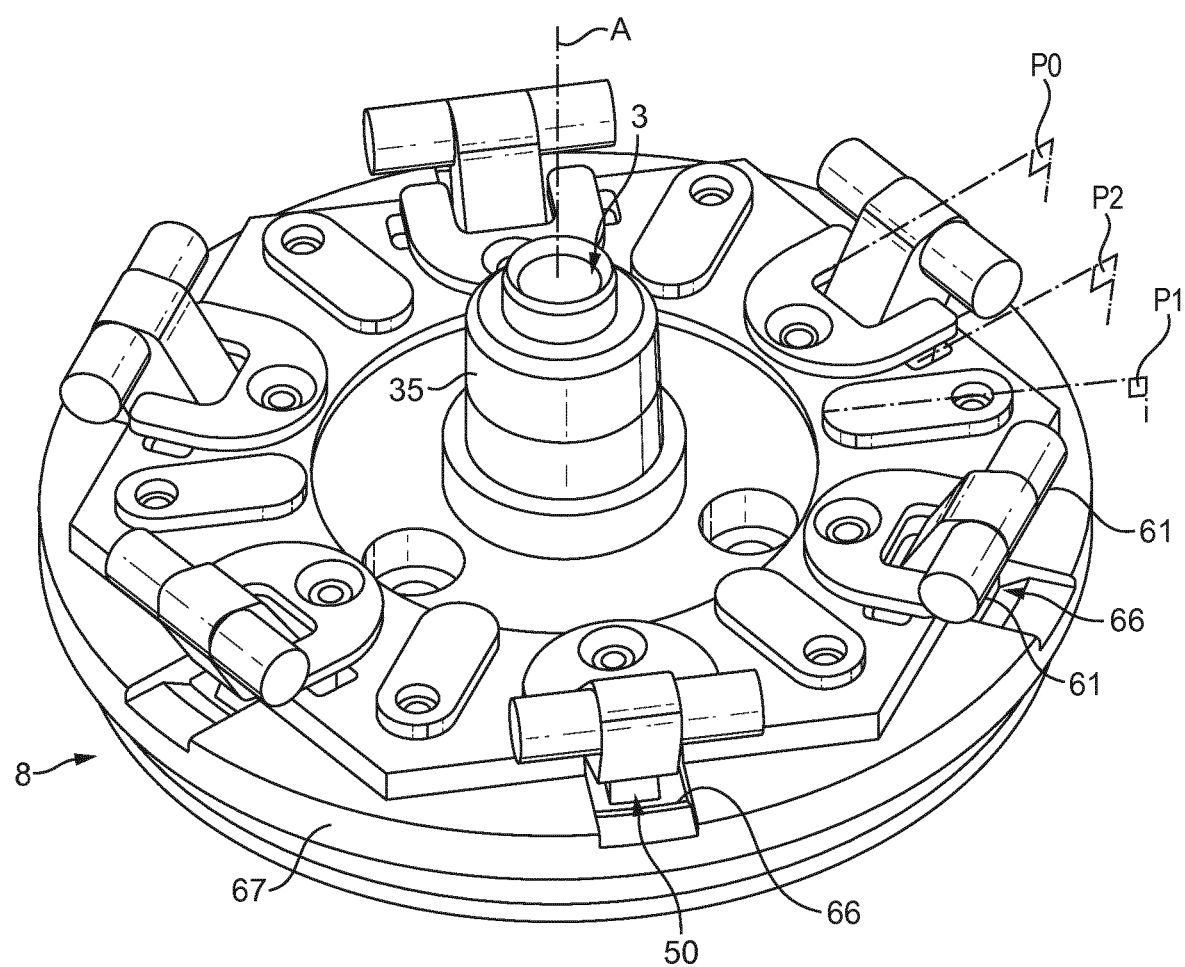
FIG. 4 shows a perspective view of a liquid interface part according to a second embodiment of the device of the present disclosure.
Figure 5:
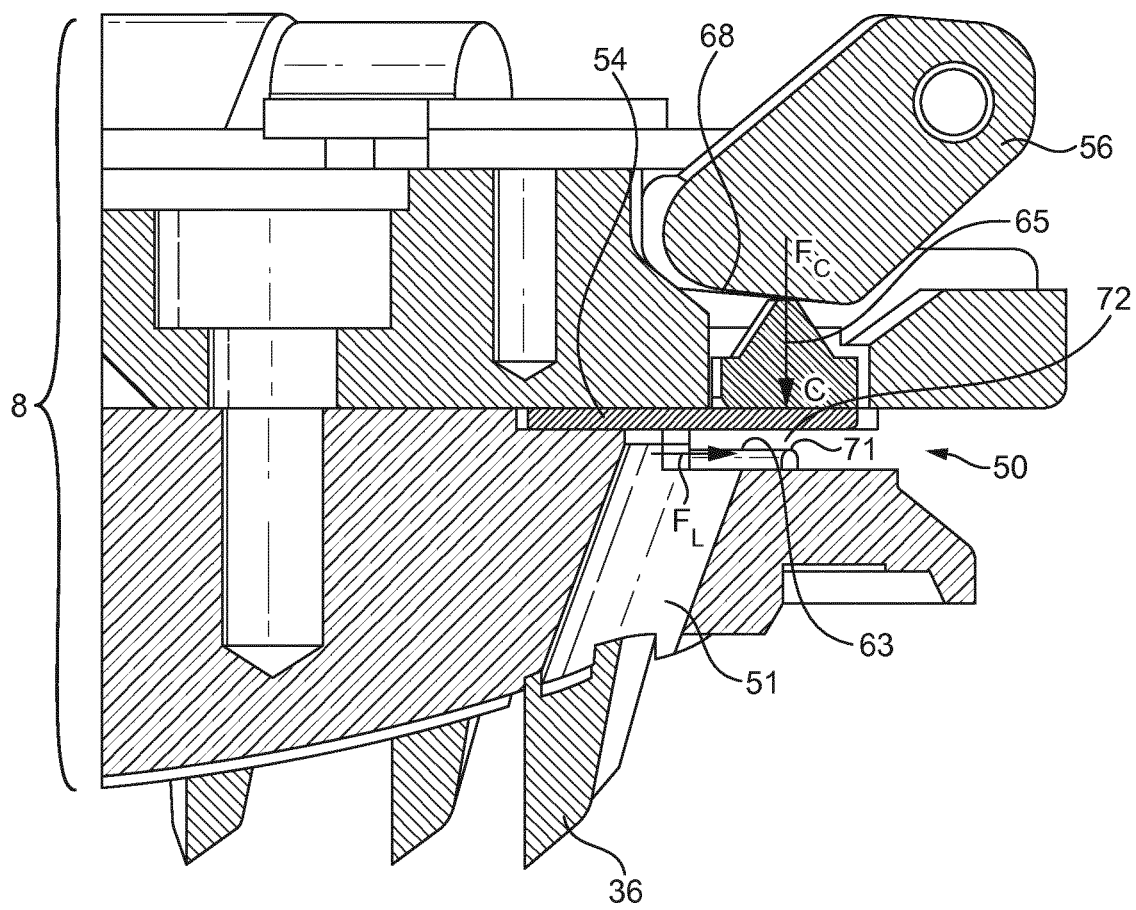
FIG. 5 shows a partial cross-section of the liquid interfacing part in the plane $P_0$ of FIG. 4.

FIG. 3 shows an example of a possible working curve of the pressure drop as a function of the rotation speed for a device of the present disclosure. This is one example of a valve state control depending on or triggered (e.g. by centrifugal forces) on the rotational speed. As the backpressure generated by the valve, i.e. the pressure drop across the valve, is a function of the state of the valve, a zero backpressure in FIG. 3 is achieved in the open state of the valve.

In the shown example the valve is kept open, and the backpressure at the valve thus kept zero, between 0 rpm and a threshold rotational speed. At the threshold rotational speed the valve is switched in the closed state. It is to be understood that on the closed state the produced beverage may still pass the valve, although with increased flow resistance.

Above the threshold rotational speed, the flow resistance and thus the backpressure increases e.g. with the square of the increasing rotational speed. It is also possible that above the threshold rotational speed the backpressure remains constant or increases according to a different, e.g. linear function by correspondingly controlling the valve (e.g. by using a feedback control using backpressure sensing means).

It is also possible that the valve is controlled such that the backpressure increases starting from a zero-value rotational speed. However, keeping the valve open until the threshold rotational speed is reached has the advantage that after a beverage has been produced, the liquid delivery to the capsule is stopped and the capsule can be completely emptied by rotating it with a rotational speed between a zero-value rotational speed and the threshold rotational speed. Thus the capsule can be emptied while the valve in the beverage draining means is in the maximum opened state and the beverage draining means thus present the smallest flow resistance.

Figure 6:
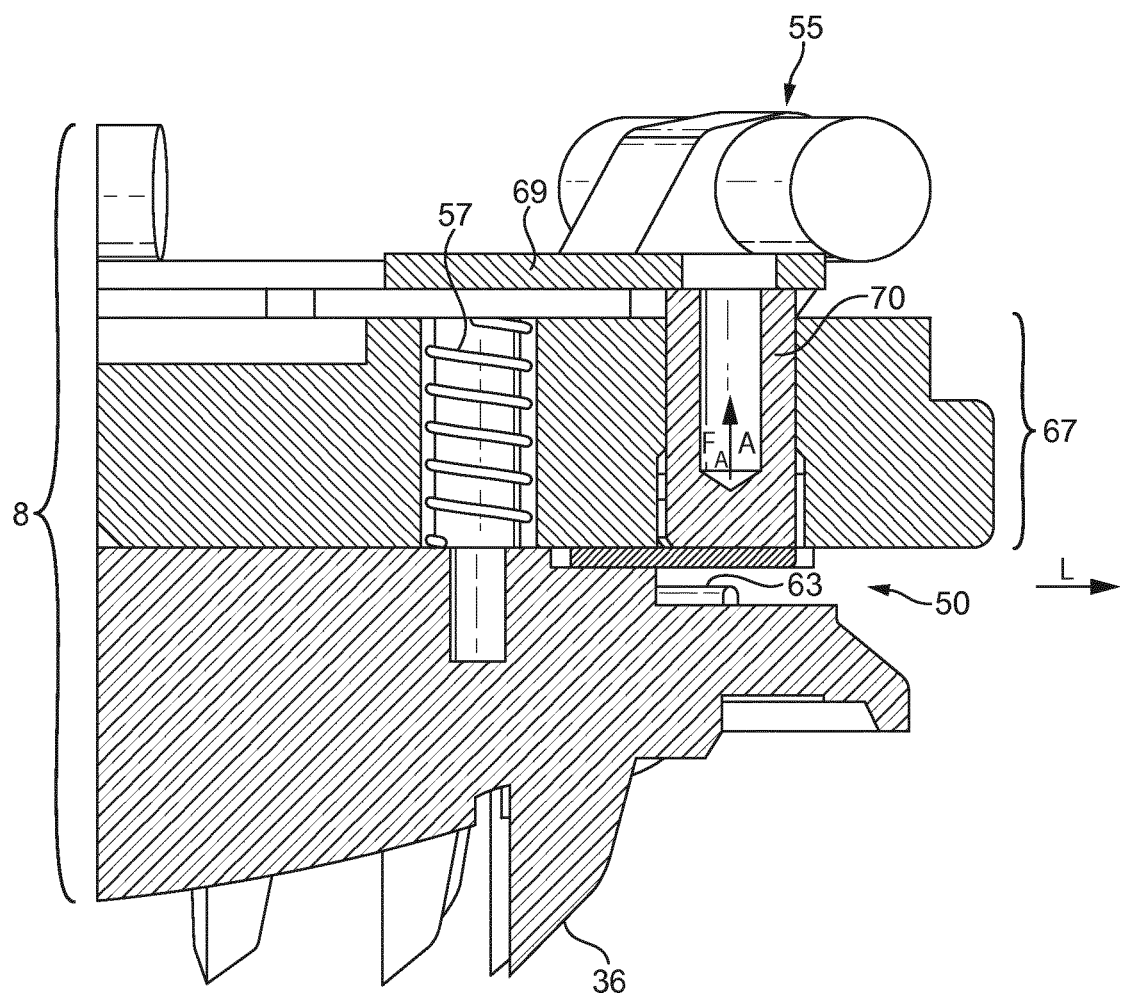
FIG. 6 shows a partial cross-section of the liquid interfacing part in the plane $P_1$ (angularly offset to $P_0$) of FIG. 4.
Figure 7:
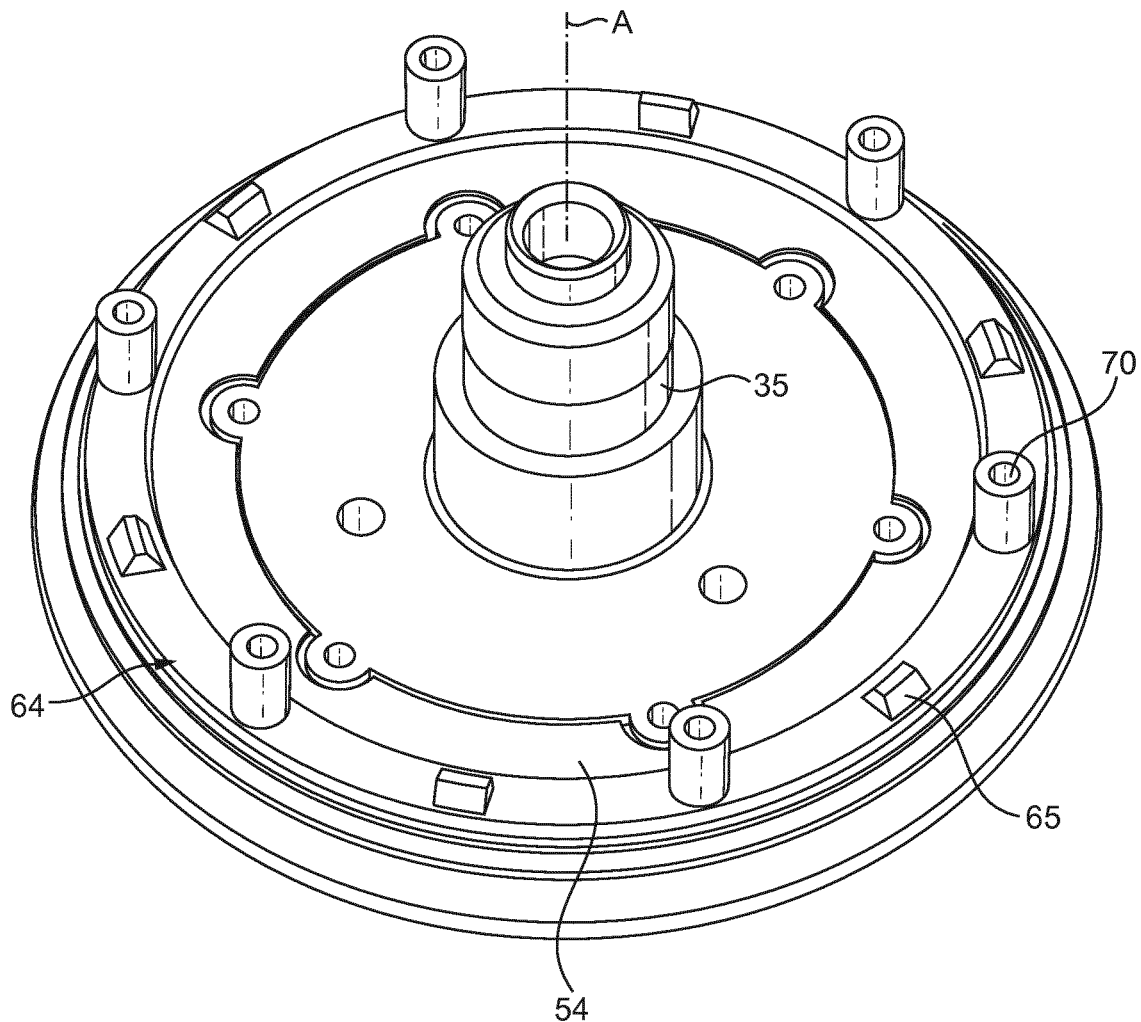
FIG. 7 shows a perspective partial view of the liquid interfacing part with the pivot means being removed.
Figure 8:
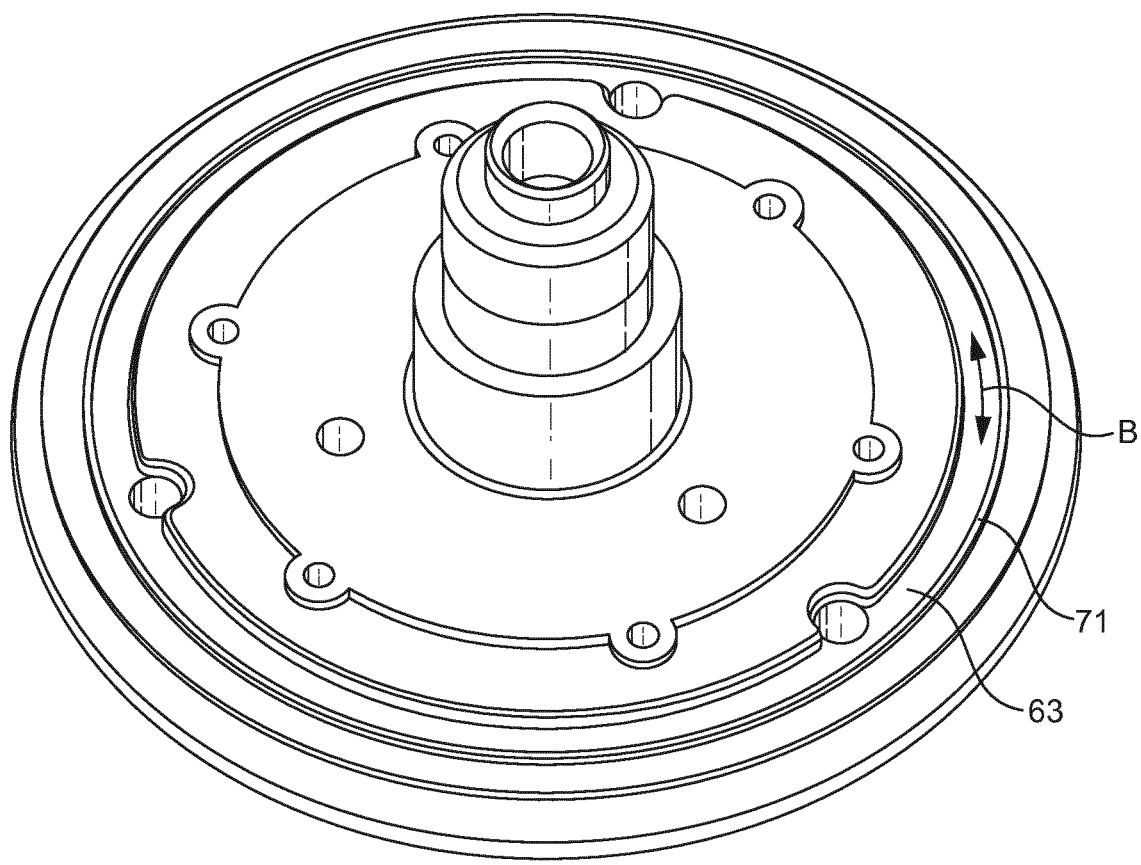
FIG. 8 shows a lower portion of the liquid interfacing part of FIGS. 4-7.
Figure 9:
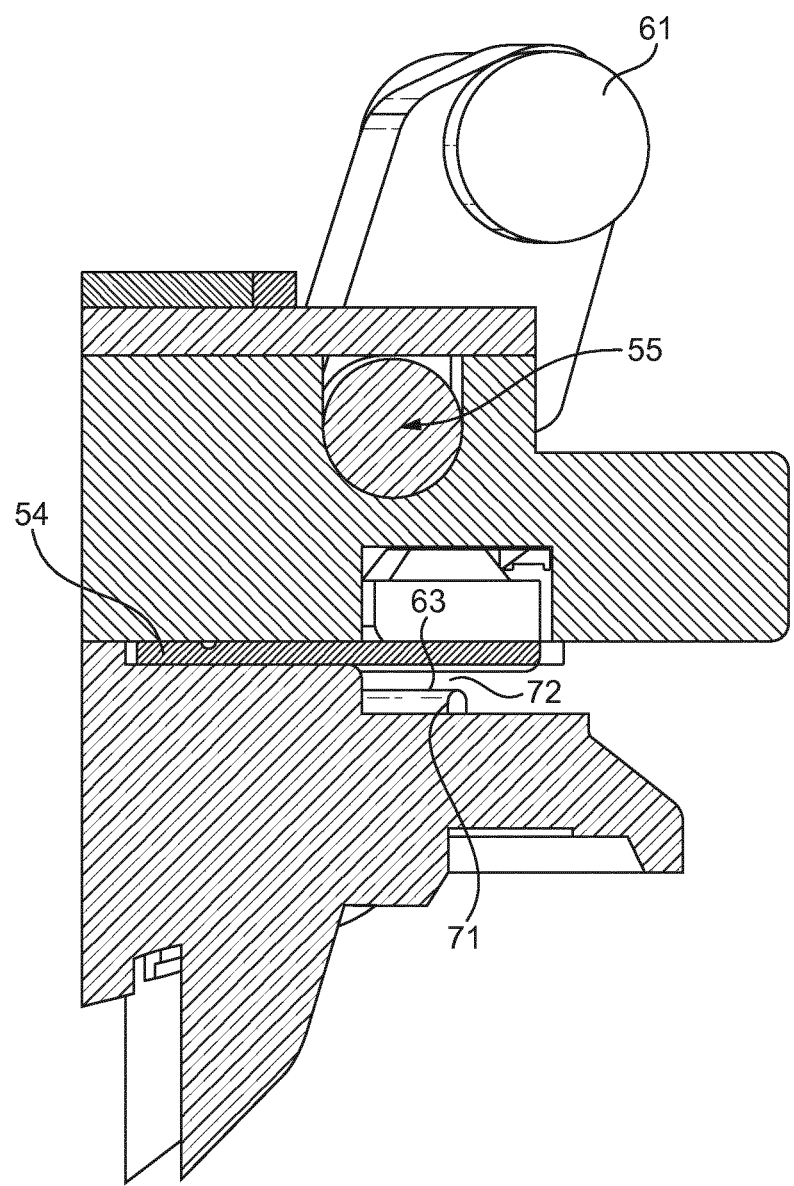
FIG. 9 shows a partial cross-section of the liquid interfacing part in the plane $P_2$ (angularly offset to $P_0$ and $P_1$) of FIG. 4.

A second embodiment of the beverage production device of the present disclosure is illustrated in FIGS. 4-9. The main difference lies in the beverage draining means comprising a circumferential valve 50 at the periphery of the rotatable liquid interfacing part. The valve comprises a continuous annular membrane 54. The external valve operating means comprises a plurality of pivot means distributed along the circumference of the liquid interfacing part 8 (FIG. 7). The pivot members are responsive to the centrifugal force when the part rotates and so arranged to control the state of the circumferential valve.

The membrane can be made of soft and elastic material such as silicone rubber or thermoplastic elastomer.

The membrane 54 is positioned above a pressure chamber 63 that is also annular and continuous at the periphery of the liquid interfacing part. A hard valve actuation ring 64 is further provided which is positioned adjacent the annular membrane 54 to act on the membrane for closing the chamber 63 upon a force is exerted thereon by the pivot means. For this, the valve actuation ring 64 has a plurality of protrusions 65 evenly distributed on its upper surface; each protrusion being positioned in an aperture 66 of an upper disc-shaped support portion 67 of the liquid interfacing part.

Each pivot means 56 is provided above the apertures 66 with a cam surface 68 that is arranged to engage the protrusion 65 of the actuation ring when rotated in a privileged direction (e.g. in clockwise direction). The pivot means 56 are mounted in a pivotable manner in the support portion 67. In certain non-limiting embodiments, the axis of pivot 55 of each pivot means is perpendicular to a radius of the liquid interfacing part. As a result, the pivot means are capable of rotating in radial directions by the effect of the centrifugal forces when the liquid interfacing means is rotated.

In the illustrated example, there are six pivot means pivoting about six different hinges 55. The pivot means 56 comprises a mass of inertia 61 (e.g. copper piece) at its free end opposite the cam surface. The mass of inertia amplifies the lever force created by the cam surface on the actuation ring.

The actuation ring is further linked to a plurality of spring elements 57. The spring element 57 is arranged, such as in a recess of the liquid interfacing part, to pull the actuation ring in a direction (A) away from the closing position of the membrane in the chamber (FIG. 6). For example, the spring element 57 acts in traction via a linkage formed by an intermediate arm 69 attached to a pin 70 of the actuation ring. There are as many spring elements and linkages as pivot means. The position of the spring elements can be angularly offset relative to the pivot means 56, for providing a sufficiently compact structure. However, many other arrangements are possible.

In certain non-limiting embodiments, the pressure chamber 63 is annular and outwardly delimited by a annular restriction ridge 71 which is engaged by the soft elastic membrane when the pivot means are moved against it via the valve actuation ring. Therefore, the beverage flow can distribute in the pressure chamber 63 in the circumferential direction (B). Of course, the annular restriction ridge can be provided alternatively or additionally on the surface of the soft membrane.

It can be noted that the two preceding modes (FIGS. 2a-2b and FIGS. 4-9) can have many common features such as the features described in relation to FIG. 1. The working curve described in relation to FIG. 3 also applies to the second embodiment.

In particular, at low rotational speeds (i.e., at or under a certain threshold) of the device, the valve remains open with the soft elastic membrane in disengaged position (FIG. 6) and the spring element pulling the actuation ring in direction (A) away from the pressure chamber. As a result, the chamber is open and beverage can flow from the capsule and channel 51, to the interfacing part and the pressure chamber 63 and be centrifuged in outward direction (L). In this state, the backpressure exerted in the pressure chamber is low and depends on the restriction opening 72 between the restriction ridge 71 and the soft membrane 54. This restriction opening can be determined to provide more or less crema.

When the rotational speed increases, the pivot means 56 are pivotally moved in the radial directions by the centrifugal forces. The pivot means act via their cam surfaces on the actuation ring and press the soft membrane towards the pressure chamber. The actuation force is directed towards the soft membrane (direction C in FIG. 5) and counters the traction force of the spring element (direction A in FIG. 6). The centrifugal force $F_L$ coming from the centrifuged liquid in the conduit 51 and pressure chamber also tends to maintain the soft membrane at least partially open and adds to the force of the spring $F_A$. A dynamic pressure equilibrium is therefore obtained in which, at a sufficient rotational speed, or speed range, the valve exerts on the beverage a backpressure (higher than at low rotational speed) and the liquid can be expelled from the pressure chamber. In this operating mode, the backpressure is such that crema is generated in the finished beverage product.

Figure 10:
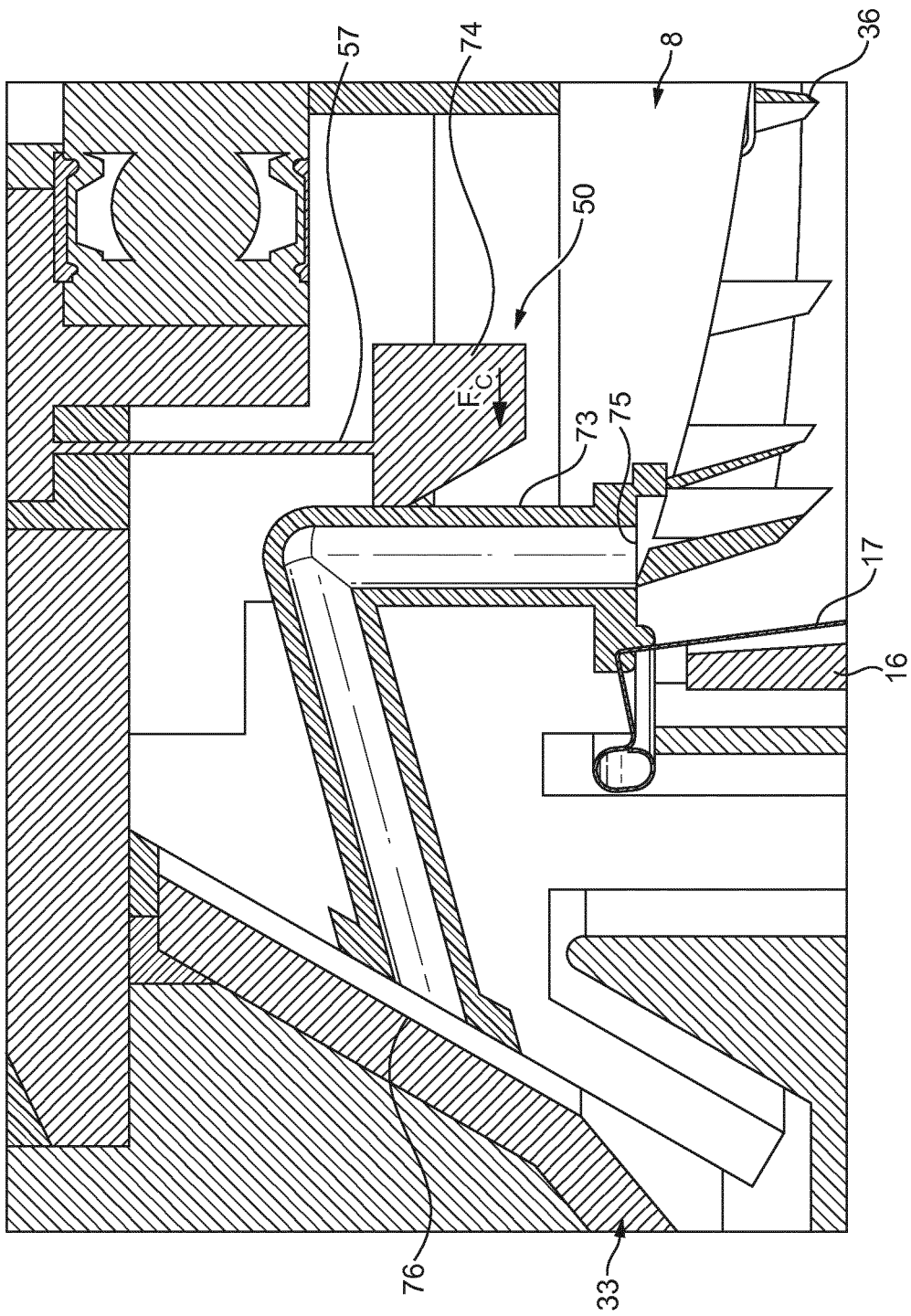
FIG. 10 shows a cross-section view of detail of the valve according to a third embodiment.

In the embodiment of FIG. 10, the valve 50 comprises a compressible beverage conduit 73 which is arranged for being compressed by a compressing member 74. The compressing member is arranged to move by effect of the centrifugal forces (direction $F_c$) which exert when the capsule is rotationally driven by the liquid interfacing part 8 and a capsule holder 16. The compressing member is connected to a spring element 57 arranged for maintaining the compressing member in a non-compressing state of the conduit when sufficiently low centrifugal forces are present, i.e., at sufficiently low rotational speeds or within a low speed range. The spring element 57 can be fixedly connected to the rotatable part 8. In the non-compressing state, the beverage conduit is maintained sufficiently open so that no or low hindrance of the beverage flow is provided. In this state, the backpressure created by the valve 50 is inexistent or low. As the centrifugal force increases, i.e., at higher rotational speeds or within a higher range of rotational speeds, the compressing member is forced in compression against the compressible conduit 73 (flow resistance increasing direction). In this second state, the conduits deforms and a restriction is created as the cross-section of the conduit diminishes thereby creating a backpressure on the beverage flow.

It should be noted that the compressible conduit in the beverage draining means may form only a portion of the whole beverage conduit. It may be a soft tube such as silicone or nitrile-rubber tube. For instance, it may extend from a beverage inlet 75 at the inner surface of the liquid interfacing part to a beverage outlet 76 positioned in front of the beverage collector 33.

Figure 11:
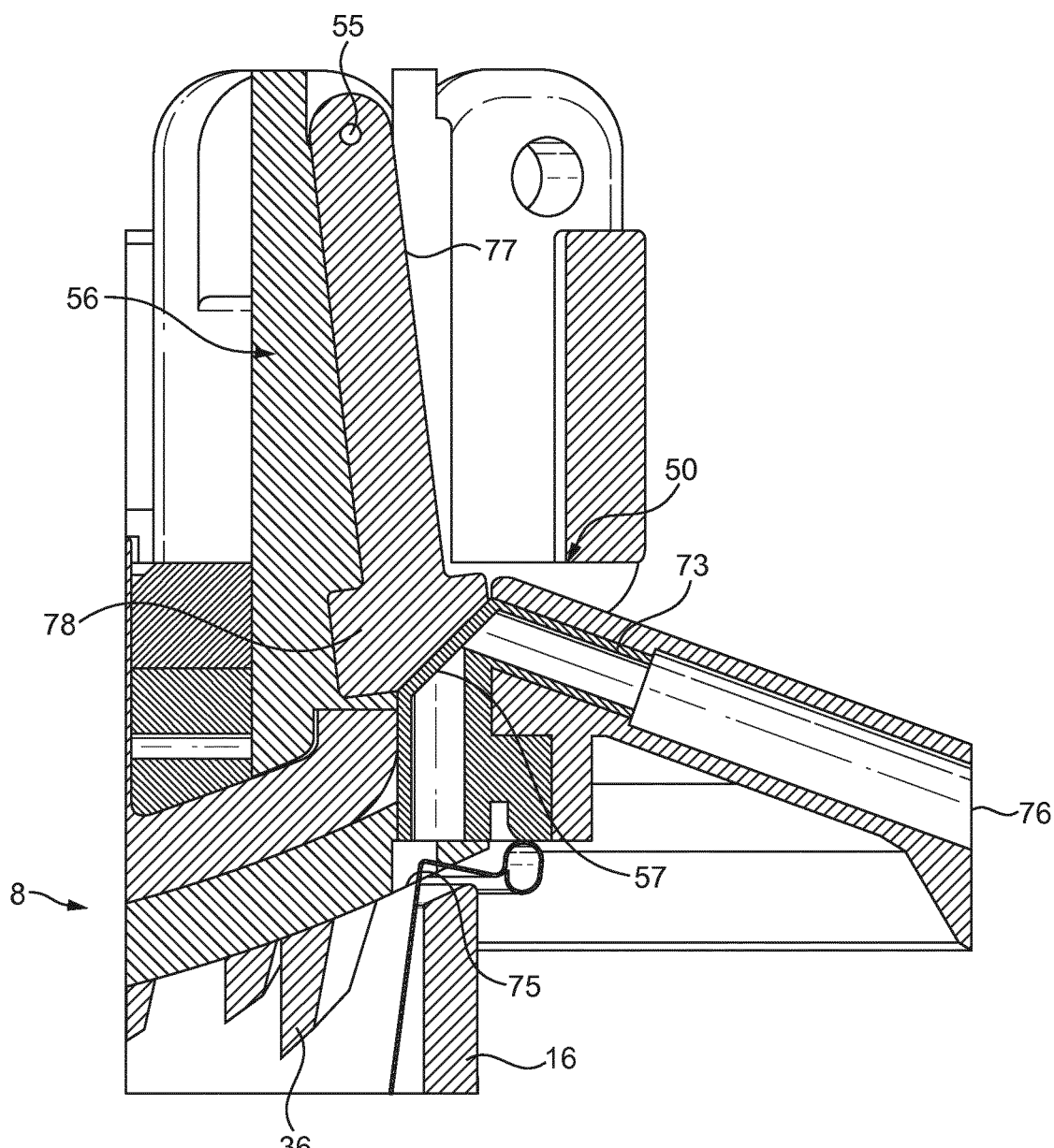
FIG. 11 shows a cross-section view of detail of the valve according to a fourth embodiment.

In the embodiment of FIG. 11, the valve 50 comprises a compressible conduit 73 which embeds the biasing or force restoring means 57. The biasing means can be formed by at least one portion of wall of the conduit or by the conduit itself which deforms elastically under the pressure of a compressing member. The compressing member can form a pivot means 56 with a pivotable arm 77 hinged at a hinge or rotation axis 55 and a compressing portion 78 forming the free end of the compressing member. The compressing portion may be enlarged compared to the arm so as form a centrifugal mass of inertia that imparts a significant closure force on the compressible conduit 73 when being submitted to centrifugal forces. The conduit may be given a non-circular cross section at the surface where it is squeezed by the compressing member.

It should be noted that the compressing member may translate rather than rotate.

Figure 12:
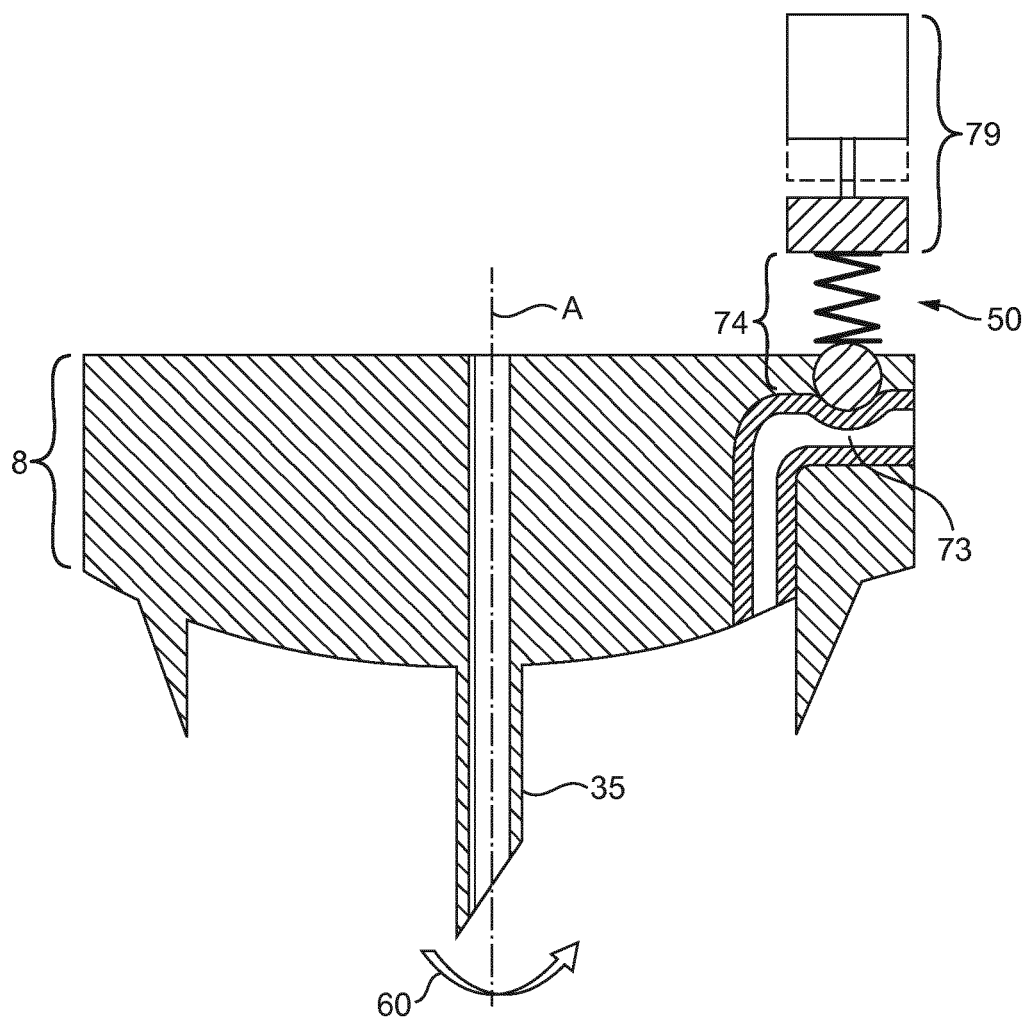
FIG. 12 shows a schematic cross-section view of a liquid interfacing part according to a fifth embodiment.

The embodiment of FIG. 12 provides a variant in which the valve is operated by external valve operating means which control the state of the valve independently from the centrifugal forces during rotation of the capsule and capsule holder. In particular, the valve 50 comprises a valve or drive actuator 79 which controls the states of the valve when receiving a dedicated input from the control unit. For example, the valve actuator can be a solenoid which acts on a valve compressing member 74. The valve compressing member 74 engages a resilient compressible conduit 73, e.g. by pinching such conduit. In a first state (dotted lines), the valve actuator is retracted in such a manner that the conduit is uncompressed and the backpressure created by the valve is relatively low. In certain non-limiting embodiments, this state corresponds to low rotational speeds of the liquid interfacing part. In a second state (full lines), the valve actuator 79 is extended to force the compressing member 74, in the flow resistance increasing direction, to pinch the conduit sufficiently to create a significant backpressure. The conduit is significantly deformed thereby hindering the flow of centrifuged beverage. In certain non-limiting embodiments, this state corresponds to higher rotational speeds. The transition from one state to the other can be triggered by the control unit in response to an input reflecting the rotational speed of the capsule in the device.

In general, the flow rate of liquid injected in the capsule is controlled by the pump which is controllable by the control unit at variable flow rates (pump 5 of FIG. 1). Such flow rate can be varied independently from the operation of the valve. For example, the flow rate can be adjusted at a higher value when the valve is in fully open state and be decreased when the valve is in a restriction or high back-pressure state.

The invention claimed is:

1. A method for preparing a beverage from a substance contained in a capsule, the capsule being placed in a beverage production device, the method comprising:
   rotationally driving the capsule at an adjustable rotational speed while feeding liquid into the capsule, and
   draining the beverage produced in the capsule by a beverage draining means, wherein flow resistance of the beverage draining means is modified by at least one valve,
   wherein a state of the at least one valve is controlled by external valve operating, means to modify the flow resistance of the beverage draining means while draining the beverage, wherein the external valve operating means applies a force from outside the beverage draining means to control the state of the valve, wherein a magnitude of the force is not based on the beverage flowing inside and against an inner wall or other element of the beverage draining means.

2. The method of claim 1, wherein the at least one valve comprises a compressible beverage conduit, and the external valve operating means comprises a valve actuator.

3. A method for preparing a beverage from a substance contained in a capsule, the capsule being placed in a beverage production device, the method comprising:
   rotationally driving the capsule at an adjustable rotational speed while feeding liquid into the capsule; and
   draining the beverage produced in the capsule by a beverage draining means, wherein flow resistance of the beverage draining means is modified by at least one valve;
   wherein a state of the at least one valve is controlled by external valve operating means to modify the flow resistance of the beverage draining means while draining the beverage, wherein the external valve operating means applies a force from outside the beverage draining means, wherein a magnitude of the force is not based on the beverage flowing inside the beverage draining means;
   wherein the at least one valve has a configuration selected from the group consisting of:

(i) the at least one valve comprises a pivot means comprising a mass of inertia, and the force applied by the external valve operating means is generated by the rotation of the mass of inertia, or (ii) the at least one valve comprises a compressing member, and the force applied by the external valve operating means is generated by the rotation of the compressing member.

4. The method of claim 3, wherein, if the at least one valve has the configuration (i), the at least one valve comprises a flexible membrane mounted on the pivot means; and wherein, if the at least one valve has the configuration (ii), the at least one valve comprises a compressible beverage conduit.

5. The method of claim 3, wherein, if the at least one valve has the configuration (ii), the compressing member includes a compressing portion, and the force applied by the external valve operating means is generated by the rotation of the compressing portion of the compressing member.

* * * * *